(12) United States Patent
Shaeffer et al.

(10) Patent No.: US 10,943,516 B2
(45) Date of Patent: Mar. 9, 2021

(54) SYSTEMS AND METHODS OF UTILIZING OUTPUT OF DISPLAY COMPONENT FOR DISPLAY TEMPERATURE COMPENSATION

(71) Applicant: Apple Inc., Cupertino, CA (US)

(72) Inventors: Derek K. Shaeffer, Redwood City, CA (US); Baris Cagdaser, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/605,484

(22) PCT Filed: Apr. 4, 2018

(86) PCT No.: PCT/US2018/026103
§ 371 (c)(1),
(2) Date: Oct. 15, 2019

(87) PCT Pub. No.: WO2018/212843
PCT Pub. Date: Nov. 22, 2018

(65) Prior Publication Data
US 2020/0066205 A1 Feb. 27, 2020

Related U.S. Application Data

(63) Continuation of application No. 15/711,679, filed on Sep. 21, 2017, now abandoned.
(Continued)

(51) Int. Cl.
*G09G 3/00* (2006.01)
*G06F 3/048* (2013.01)
(Continued)

(52) U.S. Cl.
CPC ............. *G09G 3/006* (2013.01); *G06F 3/048* (2013.01); *G09G 3/3225* (2013.01);
(Continued)

(58) Field of Classification Search
None
See application file for complete search history.

(56) References Cited

U.S. PATENT DOCUMENTS

2002/0090470 A1 7/2002 Kubota et al.
2006/0170368 A1 8/2006 Jang
(Continued)

OTHER PUBLICATIONS

PCT Search Report and Written Opinion for PCT/US2018/026103 dated Jul. 2, 2018, 21 pages.

*Primary Examiner* — Duane N Taylor, Jr.
(74) *Attorney, Agent, or Firm* — Fletcher Yoder PC

(57) ABSTRACT

A method of adjusting a control signal to a component of an electronic display based on a temperature of the component, includes measuring current outputs of the component in response to applied gate voltages. The method also includes applying a mapping function to the current outputs to generate adapted current outputs, which are utilized to determine an intermediate value related to the temperature of the component. The intermediate value corresponds to a relationship between the applied gate voltages and the adapted current outputs. The intermediate value also enables the intermediate value to be substantially independent of hysteresis of the current outputs. The control signals to the component may be adjusted based at least in part on the determined intermediate value for the component.

20 Claims, 8 Drawing Sheets

Related U.S. Application Data

(60) Provisional application No. 62/506,388, filed on May 15, 2017.

(51) Int. Cl.
  *G09G 3/3258* (2016.01)
  *G09G 3/3225* (2016.01)
  *G09G 3/3233* (2016.01)
  *G09G 3/20* (2006.01)
  *G09G 3/3266* (2016.01)
  *G09G 3/3275* (2016.01)

(52) U.S. Cl.
  CPC ......... *G09G 3/3233* (2013.01); *G09G 3/3258* (2013.01); *G09G 3/2003* (2013.01); *G09G 3/3266* (2013.01); *G09G 3/3275* (2013.01); *G09G 2310/08* (2013.01); *G09G 2320/0233* (2013.01); *G09G 2320/0242* (2013.01); *G09G 2320/0252* (2013.01); *G09G 2320/0257* (2013.01); *G09G 2320/0285* (2013.01); *G09G 2320/041* (2013.01); *G09G 2330/021* (2013.01); *G09G 2330/12* (2013.01); *G09G 2360/16* (2013.01)

(56) References Cited

U.S. PATENT DOCUMENTS

| | | |
|---|---|---|
| 2007/0182694 A1 | 8/2007 | Lee et al. |
| 2007/0210996 A1 | 9/2007 | Mizukoshi et al. |
| 2009/0256854 A1 | 10/2009 | Mizukoshi et al. |
| 2009/0284513 A1 | 11/2009 | Weindorf et al. |
| 2009/0299543 A1 | 12/2009 | Cox et al. |
| 2010/0066257 A1 | 3/2010 | Lin et al. |
| 2010/0225630 A1 | 9/2010 | Levey et al. |
| 2012/0139955 A1* | 6/2012 | Jaffari .................. G09G 3/3258 345/690 |
| 2014/0111499 A1 | 4/2014 | Jang et al. |
| 2015/0115826 A1 | 4/2015 | Koo et al. |
| 2015/0154908 A1 | 6/2015 | Nam et al. |
| 2017/0053590 A1 | 2/2017 | Song et al. |

* cited by examiner

SYSTEMS AND METHODS OF UTILIZING OUTPUT OF DISPLAY COMPONENT FOR DISPLAY TEMPERATURE COMPENSATION

CROSS REFERENCE TO RELATED APPLICATIONS

This application is a national stage filing of PCT Application No. PCT/US2018/026103, filed Apr. 4, 2018, and entitled "Systems and Methods of Utilizing Output of Display Component for Display Temperature Compensation," which is a continuation of and claims priority to U.S. Non-Provisional application Ser. No. 15/711,679, filed Sep. 21, 2017, and entitled "Systems and Methods of Utilizing Output of Display Component for Display Temperature Compensation," which claims priority to and the benefit of U.S. Provisional Application No. 62/506,388, filed May 15, 2017, and entitled "Systems and Methods of Utilizing Output of Display Component for Display Temperature Compensation," the disclosures of which are hereby incorporated by reference in their entireties.

BACKGROUND

The present disclosure relates generally to electronic displays and, more particularly, accurately measuring temperatures of the electronic displays.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Electronic devices often use electronic displays to present visual representations of information as text, still images, and/or video by displaying one or more image frames. For example, such electronic devices may include computers, mobile phones, portable media devices, tablets, televisions, virtual-reality headsets, vehicle dashboards, and wearable devices, among many others. To accurately display an image frame, an electronic display may control light emission (e.g., luminance) from its display pixels. However, output of components of a display pixel may be affected by the output (e.g., light emission, current) of the component during one or more previous image frames, a phenomenon known as hysteresis. The hysteresis exhibited by the components of the electronic display may affect perceived image quality of the electronic display, for example, by producing ghost images, mura effects, or inaccurate colors.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The present disclosure generally relates to electronic displays and, more particularly, to improving response time of electronic displays. Generally, an electronic display may display an image frame by programming display pixels with image data and instructing the display pixels to emit light. The image data provided for a display pixel may include a first or target luminance (e.g., brightness) and a first or target color (e.g., chromaticity) with which to display the image data. During operation, the display pixel of the electronic display may display the image data of the image frame at the first luminance and the first color for at least a portion of a first display period. The display pixel may display subsequent image data of the image frame at a second luminance and a second color for at least a portion of the subsequent second display period. However, the output of a component of the display pixel during the second display period may change due to the control signals for the first luminance and the first color. This dependence of the output of the component during one display period upon a previous display period is referred to as hysteresis.

To reduce the likelihood that hysteresis may affect the perceived image quality of a subsequent image frame, the electronic display may determine the temperature of the component and adjust subsequent signals to the component based on the temperature. In particular, the temperature of the component may be determined based on a derived relationship between two or more inputs (e.g., gate voltages) to the component, two or more outputs (e.g., currents) from the component, and the temperature. Two or more test signals applied to the component may yield an intermediate value for comparison with reference temperature data to determine the temperature of the component. This intermediate value may be related to temperature of the component, yet largely independent of hysteresis. The temperature of the component may be correlated with a threshold voltage shift to determine an appropriate compensation to control signals to the component.

BRIEF DESCRIPTION OF THE DRAWINGS

Various aspects of this disclosure may be better understood upon reading the following detailed description and upon reference to the drawings in which.

DETAILED DESCRIPTION

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but may nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "including" and "having" are intended to be inclusive and mean that there may be additional elements other than the listed elements. Additionally, it should be understood that references to "one embodiment," "an embodiment," "embodiments," and "some embodiments" of the present disclosure are not intended to be interpreted as excluding the existence of additional embodiments that also incorporate the recited features.

Figure 1:
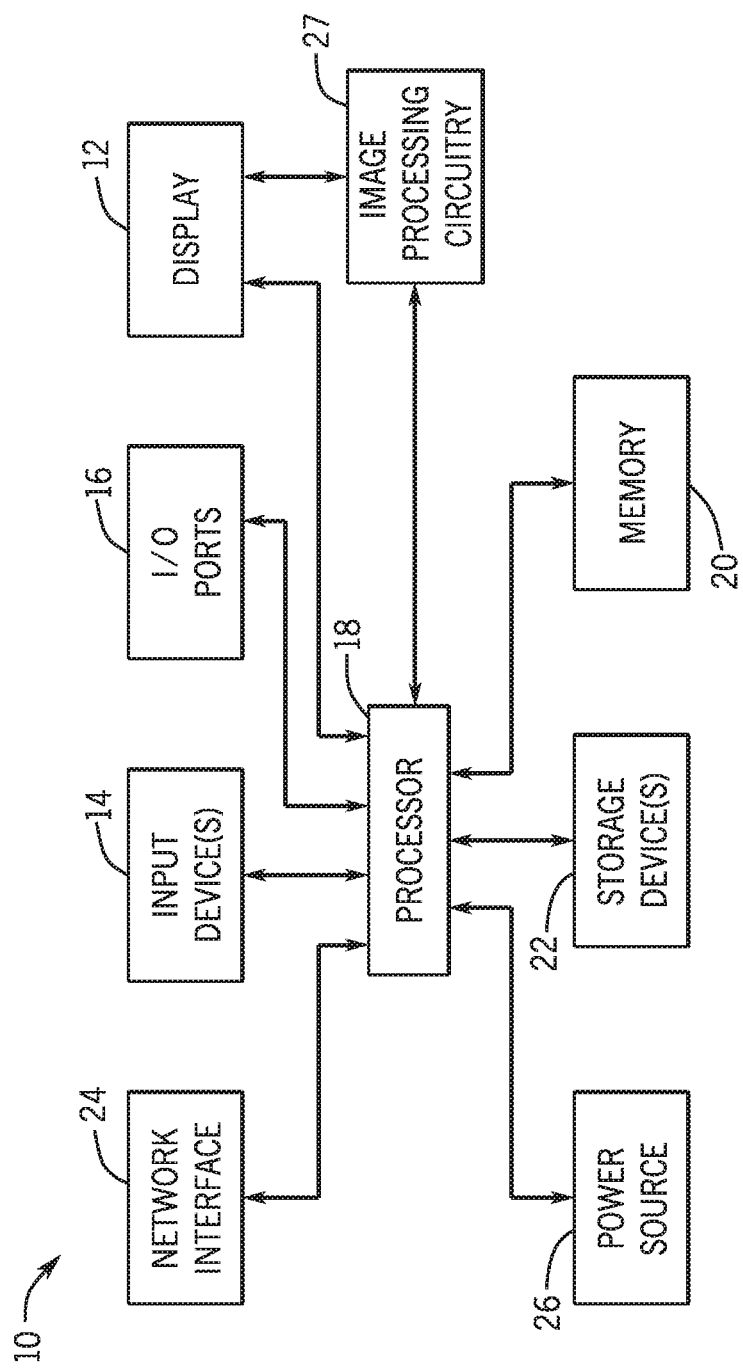
FIG. 1 is a block diagram of an electronic device used to display image frames, in accordance with an embodiment of the present disclosure.

To produce accurate images on an electronic display in various conditions, control signals to display pixels may be compensated based at least in part on one or more temperature measurements of the electronic display. Systems and methods described herein may reduce or eliminate effects of hysteresis from test signals used to determine temperature measurements of the display, thereby improving the compensation of control signals based on the one or more temperature measurements. To help illustrate, an electronic device 10 including an electronic display 12 is shown in FIG. 1. As will be described in more detail below, the electronic device 10 may be any suitable electronic device, such as a computer, a mobile phone, a portable media device, a tablet, a television, a virtual-reality headset, a vehicle dashboard, and the like. Thus, it should be noted that FIG. 1 is merely one example of a particular implementation and is intended to illustrate the types of components that may be present in the electronic device 10.

In the depicted embodiment, the electronic device 10 includes the electronic display 12, one or more input devices 14, one or more input/output (I/O) ports 16, a processor core complex 18 having one or more processor(s) or processor cores, local memory 20, a main memory storage device 22, a network interface 24, a power source 26, and image processing circuitry 27. The various components described in FIG. 1 may include hardware elements (e.g., circuitry), software elements (e.g., a tangible, non-transitory computer-readable medium storing instructions), or a combination of both hardware and software elements. It should be noted that the various depicted components may be combined into fewer components or separated into additional components. For example, the local memory 20 and the main memory storage device 22 may be included in a single component. Additionally, the image processing circuitry 27 (e.g., a graphics processing unit) may be included in the processor core complex 18.

As depicted, the processor core complex 18 is operably coupled with local memory 20 and the main memory storage device 22. Thus, the processor core complex 18 may execute instruction stored in local memory 20 and/or the main memory storage device 22 to perform operations, such as generating and/or transmitting image data. As such, the processor core complex 18 may include one or more general purpose microprocessors, one or more application specific processors (ASICs), one or more field programmable logic arrays (FPGAs), or any combination thereof.

In addition to executable instructions, the local memory 20 and/or the main memory storage device 22 may store data to be processed by the processor core complex 18. Thus, in some embodiments, the local memory 20 and/or the main storage device 22 may include one or more tangible, non-transitory, computer-readable mediums. For example, the local memory 20 may include random access memory (RAM) and the main memory storage device 22 may include read only memory (ROM), rewritable non-volatile memory such as flash memory, hard drives, optical discs, and the like.

As depicted, the processor core complex 18 is also operably coupled with the network interface 24. In some embodiments, the network interface 24 may facilitate communicating data with another electronic device and/or a network. For example, the network interface 24 (e.g., a radio frequency system) may enable the electronic device 10 to communicatively couple to a personal area network (PAN), such as a Bluetooth network, a local area network (LAN), such as an 802.11x Wi-Fi network, and/or a wide area network (WAN), such as a 4G or LTE cellular network.

Additionally, as depicted, the processor core complex 18 is operably coupled to the power source 26. In some embodiments, the power source 26 may provide electrical power to one or more component in the electronic device 10, such as the processor core complex 18 and/or the electronic display 12. Thus, the power source 26 may include any suitable source of energy, such as a rechargeable lithium polymer (Li-poly) battery and/or an alternating current (AC) power converter.

Furthermore, as depicted, the processor core complex 18 is operably coupled with the I/O ports 16. In some embodiments, the I/O ports 16 may enable the electronic device 10 to interface with other electronic devices. For example, a portable storage device may be connected to an I/O port 16, thereby enabling the processor core complex 18 to communicate data with the portable storage device.

As depicted, the electronic device 10 is also operably coupled with input devices 14. In some embodiments, the input device 14 may facilitate user interaction with the electronic device 10, for example, by receiving user inputs. Thus, the input devices 14 may include a button, a keyboard, a mouse, a trackpad, and/or the like. Additionally, in some embodiments, the input devices 14 may include touch-sensing components in the electronic display 12. In such embodiments, the touch sensing components may receive user inputs by detecting occurrence and/or position of an object touching the surface of the electronic display 12.

In addition to enabling user inputs, the electronic display 12 may include a display panel with one or more display pixels. As described above, the electronic display 12 may control light emission from the display pixels to present visual representations of information, such as a graphical user interface (GUI) of an operating system, an application interface, a still image, or video content, by display image frames based at least in part on corresponding image data. In some embodiments, the electronic display 12 may be a display using light-emitting diodes (LED display), a self-emissive display, such as an organic light-emitting diode (OLED) display, or the like. Additionally, in some embodiments, the electronic display 12 may refresh display of an image and/or an image frame, for example, at 60 Hz (corresponding to refreshing 60 frames per second), 120 Hz (corresponding to refreshing 120 frames per second), and/or 240 Hz (corresponding to refreshing 240 frames per second).

As depicted, the electronic display 12 is operably coupled to the processor core complex 18 and the image processing circuitry 27. In this manner, the electronic display 12 may display image frames based at least in part on image data generated by the processor core complex 18 and/or the image processing circuitry 27. Additionally or alternatively, the electronic display 12 may display image frames based at least in part on image data received via the network interface 24 and/or the I/O ports 16.

Figure 2:
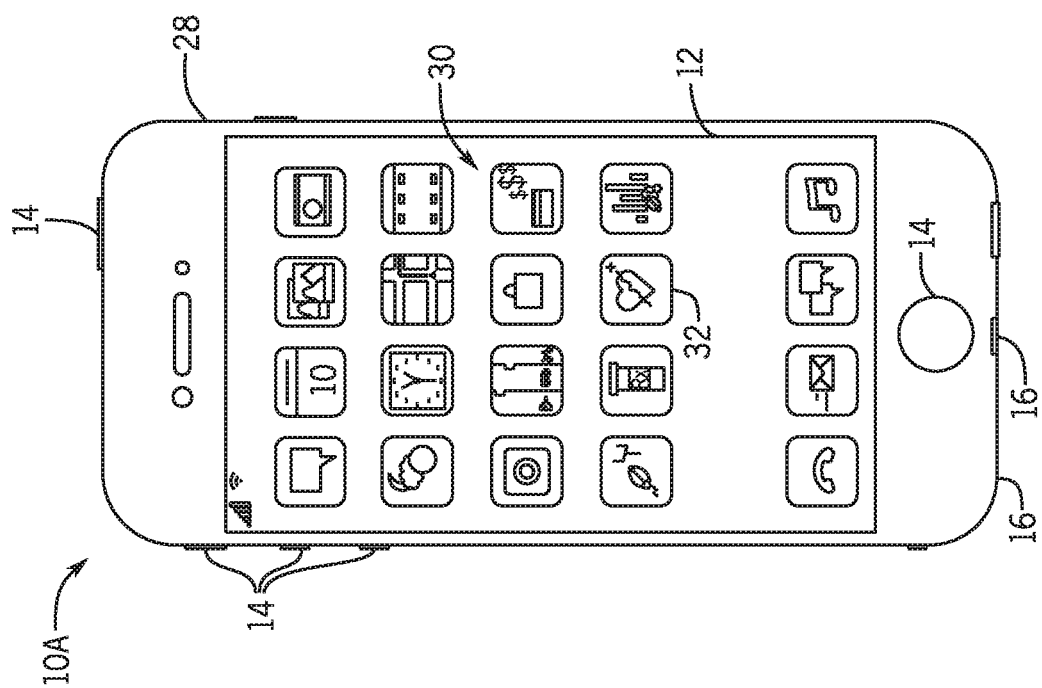
FIG. 2 is one example of the electronic device of FIG. 1, in accordance with an embodiment of the present disclosure.

As described above, the electronic device 10 may be any suitable electronic device. To help illustrate, one example of a suitable electronic device 10, specifically a handheld device 10A, is shown in FIG. 2. In some embodiments, the handheld device 10A may be a portable phone, a media player, a personal data organizer, a handheld game platform, and/or the like. For example, the handheld device 10A may be a smart phone, such as any iPhone® model available from Apple Inc.

As depicted, the handheld device 10A includes an enclosure 28 (e.g., housing). In some embodiments, the enclosure 28 may protect interior components from physical damage and/or shield them from electromagnetic interference. Additionally, as depicted, the enclosure 28 surrounds the electronic display 12. In the depicted embodiment, the electronic display 12 is displaying a graphical user interface (GUI) 30 having an array of icons 32. By way of example, when an icon 32 is selected either by an input device 14 or a touch-sensing component of the electronic display 12, an application program may launch.

Furthermore, as depicted, input devices 14 extend through the enclosure 28. As described above, the input devices 14 may enable a user to interact with the handheld device 10A. For example, the input devices 14 may enable the user to activate or deactivate the handheld device 10A, navigate a user interface to a home screen, navigate a user interface to a user-configurable application screen, activate a voice-recognition feature, provide volume control, and/or toggle between vibrate and ring modes. As depicted, the I/O ports 16 also open through the enclosure 28. In some embodiments, the I/O ports 16 may include, for example, an audio jack to connect to external devices.

Figure 3:
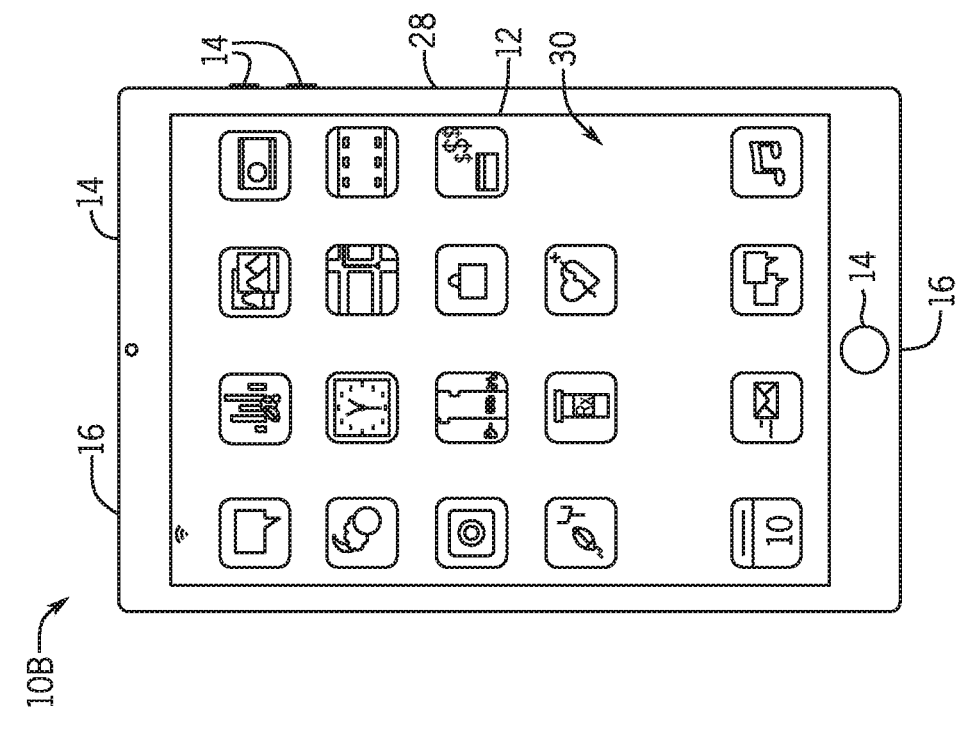
FIG. 3 is another example of the electronic device of FIG. 1, in accordance with an embodiment of the present disclosure.
Figure 4:
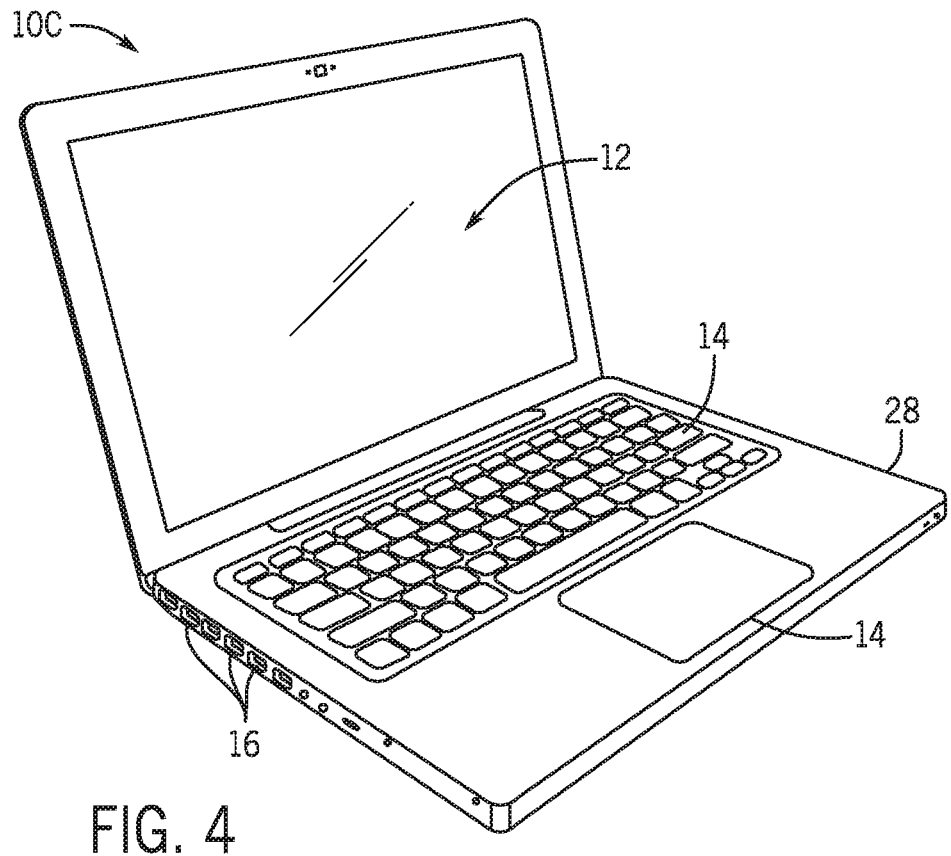
FIG. 4 is another example of the electronic device of FIG. 1, in accordance with an embodiment of the present disclosure.
Figure 5:
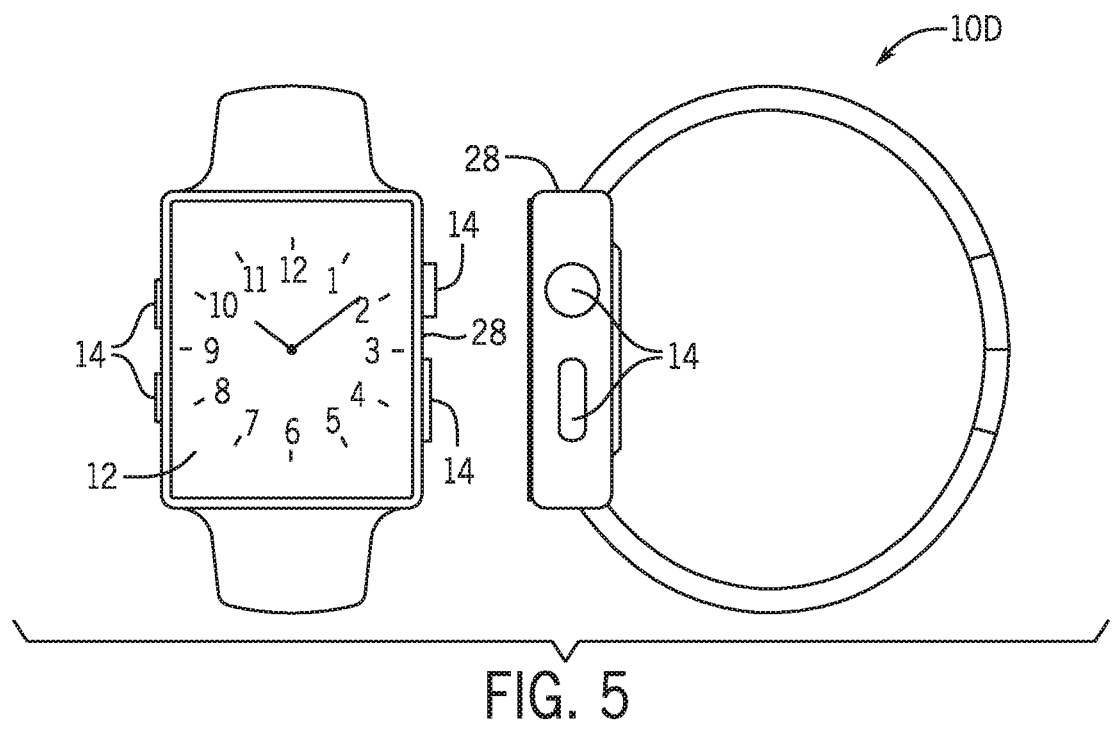
FIG. 5 is another example of the electronic device of FIG. 1, in accordance with an embodiment of the present disclosure.

To further illustrate an example of a suitable electronic device 10, specifically a tablet device 10B, is shown in FIG. 3. For illustrative purposes, the tablet device 10B may be any iPad® model available from Apple Inc. A further example of a suitable electronic device 10, specifically a computer 10C, is shown in FIG. 4. For illustrative purposes, the computer 10C may be any Macbook® or iMac® model available from Apple Inc. Another example of a suitable electronic device 10, specifically a watch 10D, is shown in FIG. 5. For illustrative purposes, the watch 10D may be any Apple Watch® model available from Apple Inc. As depicted, the tablet device 10B, the computer 10C, and the watch 10D each also includes an electronic display 12, input devices 14, and an enclosure 28.

Figure 6:
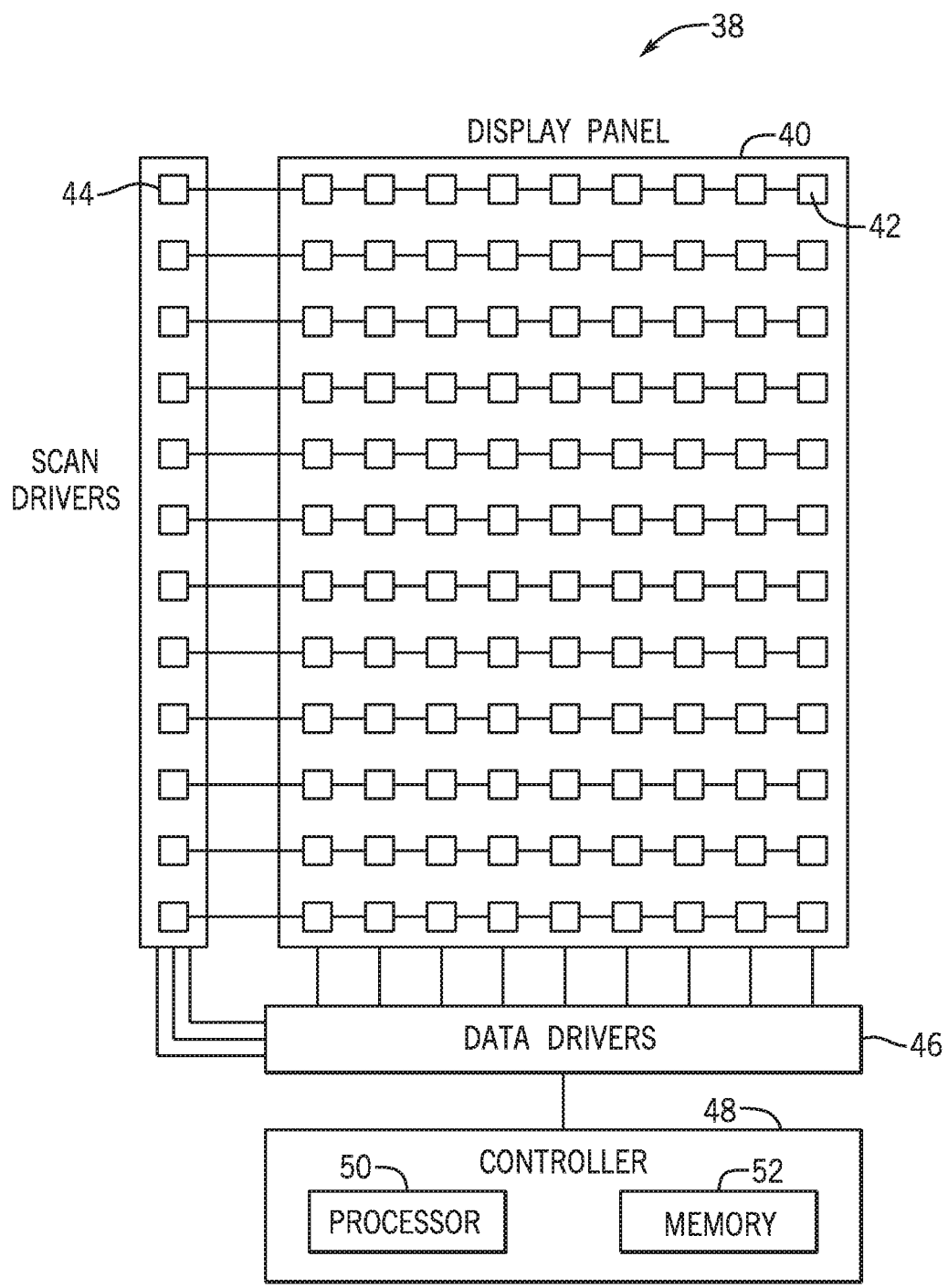
FIG. 6 is a high-level schematic diagram of display driver circuitry of the electronic display of FIG. 1, in accordance with an embodiment of the present disclosure.

With the foregoing in mind, a schematic diagram of display driver circuitry 38 of the electronic display 12 is shown in FIG. 6. The display driver circuitry 38 may include circuitry, such as one or more integrated circuits, state machines made of discrete logic and other components, and the like, that provide an interface function between, for example, the processor 18 and/or the image processing circuitry 27 and the electronic display 12. As depicted, the display driver circuitry 38 includes a display panel 40 with multiple display pixels 42 arranged in rows and columns. A set of scan drivers 44 and a set of data drivers 46 are communicatively coupled to the display pixels 42. As illustrated, one scan driver 44 is communicatively coupled to each row of display pixels 42, and one data driver 46 is communicatively coupled to each column of display pixels 42. A scan driver 44 may supply one or more scan signals or control signals (e.g., voltage signals) to a display pixel row to control operation (e.g., programming, writing, and/or emission period) of the row. The scan drivers 44 may be daisy chained together, such that a single control signal may be sent to the set of scan drivers 44 to display an image frame. Timing of the control signal may be controlled by propagation of the control signal through the set of scan drivers 44. A data driver 46 may supply one or more data signals (e.g., voltage signals) to a display pixel column to program (e.g., write) one or more display pixel in the column. In some embodiments, electrical energy may be stored in a storage component (e.g., capacitor) of a display pixel to control magnitude of current (e.g., via one or more programmable current sources) to facilitate controlling light emission from the display pixel. It should be noted that any suitable arrangement of communicatively coupling scan drivers 44 and data drivers 46 to the display pixels 42 is contemplated (e.g., communicatively coupling one or more scan drivers 44 and/or one or more data drivers 46 to one or more display pixels 42).

As depicted, a controller 48 is communicatively coupled to the data drivers 46. The controller 48 may instruct the data drivers 46 to provide one or more data signals to the display pixels 42. The controller 48 may also instruct the scan drivers 44 to provide one or more control signals to the display pixels 42 (via the data drivers 46). While the controller 48 is shown as part of the display panel 40, it should be understood that the controller 48 may be external to the display panel 40. Moreover, the controller 48 may be communicatively coupled to the scan drivers 44 and the data drivers 46 in any suitable arrangement (e.g., directly coupling to the scan drivers 44, directly coupling to the scan drivers 44 and the data drivers 46, and the like). The controller 48 may include one or more processors 50 and one or more memory devices 52. In some embodiments, the processor(s) 50 may execute instructions stored in the memory device(s) 52. Thus, in some embodiments, the processor(s) 50 may be included in the processor core complex 18, the image processing circuitry 27, a timing controller (TCON) in the electronic display 12, and/or a separate processing module. Additionally, in some embodiments, the memory device(s) 52 may be included in the local memory 20, the main memory storage device 22, and/or one or more separate tangible, non-transitory, computer-readable media.

The controller 48 may control the display panel 40 to display an image frame at a first or target luminance or brightness. For example, the controller 48 may receive image data from an image data source that indicates the target luminance of one or more display pixels 42 for displaying an image frame. The controller 48 may display the image frame by controlling (e.g., by using a switching element) magnitude and/or duration (e.g., an emission period) current is supplied to light-emission components (e.g., an OLED) to facilitate achieving the target luminance.

That is, the controller 48 may display the image frame for a target emission period, which may be a ratio or percentage of a display period of the image frame. For example, if the target luminance of the image frame is 60% of a maximum luminance available of the electronic display, the controller 48 may switch on the display pixels to emit light for a ratio or percentage (e.g., 60%) of a display period of the image frame that results in displaying the image frame at the target luminance. The controller 48 may switch off light emitting devices of the display pixels to stop emitting light for the remainder (e.g., 40%) of the display period. In this manner, the controller 48 may instruct the display panel 40 to display the image frame at the target luminance. In some embodiments, the controller 48 may also control magnitude of the current supplied to enable light emission to control luminance of the image frame.

Figure 7:
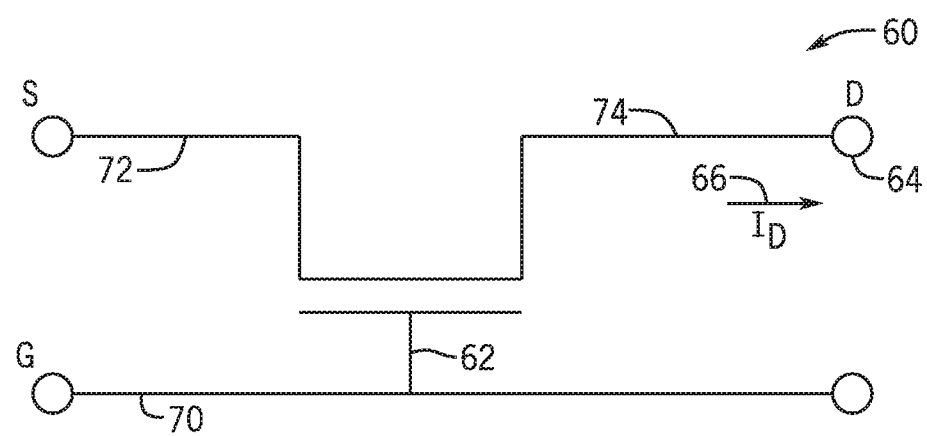
FIG. 7 is an embodiment of a component that receives an applied voltage and produces an output based at least in part on the applied voltage.

It may be appreciated that each display pixel 42 of the display panel 40 may have one or more components (e.g., transistors, diodes). FIG. 7 illustrates an embodiment of a component 60 that receives an applied voltage and produces an output voltage or output current. For example, a voltage ($V_{GS}$) applied to a gate 62 of the component 60 may set the component in a conducting state, and produce a current ($I_D$) 66 at a drain 64 of the component 60. In some embodiments, the component 60 may be in a non-conducting state unless or until a voltage greater than a threshold voltage ($V_{TH}$) is applied to the gate 62. The threshold voltage ($V_{TH}$) of the component 60 may be based at least in part on a structure of the component 60 (e.g., thickness, shape, type), materials of the component 60 (e.g., substrate material, dopant material, dopant quantity), temperature of the component 60, or any combination thereof. It may be appreciated that while the component 60 of FIG. 7 only illustrates the gate 62, the drain 64, and a source 68, some embodiments of components 60 may have other inputs and outputs. Additionally, multiple components 60 may be coupled together such that more than one component 60 is coupled to a gate line 70, a source line 72, or a drain line 74, or any combination thereof.

The voltage ($V_{GS}$) applied to the gate 62 of the component 60 affects the current ($I_D$) 66 produced at the drain 64 of the respective component 60. The relationship between the voltage ($V_{GS}$) and the current ($I_D$) 66 may vary based at least in part on the type of component (e.g., transistor, diode), the materials of the component (e.g., low-temperature polysilicon (LTPS), metal-oxide), the threshold voltage ($V_{TH}$), or any combination thereof. Additionally, the relationship between the voltage ($V_{GS}$) and the current ($I_D$) 66 of the component 60 is related to a temperature of the component 60. Accordingly, when the $V_{GS}$ applied to the component 60, the resulting current $I_D$ from the component 60, and the relationship between $V_{GS}$ and $I_D$ (or between $V_{GS}$ and a mapped function of $I_D$ as described below) for the component 60 are known, the temperature of the component 60 may be determined, such as via an equation or a look-up table.

Figure 8:
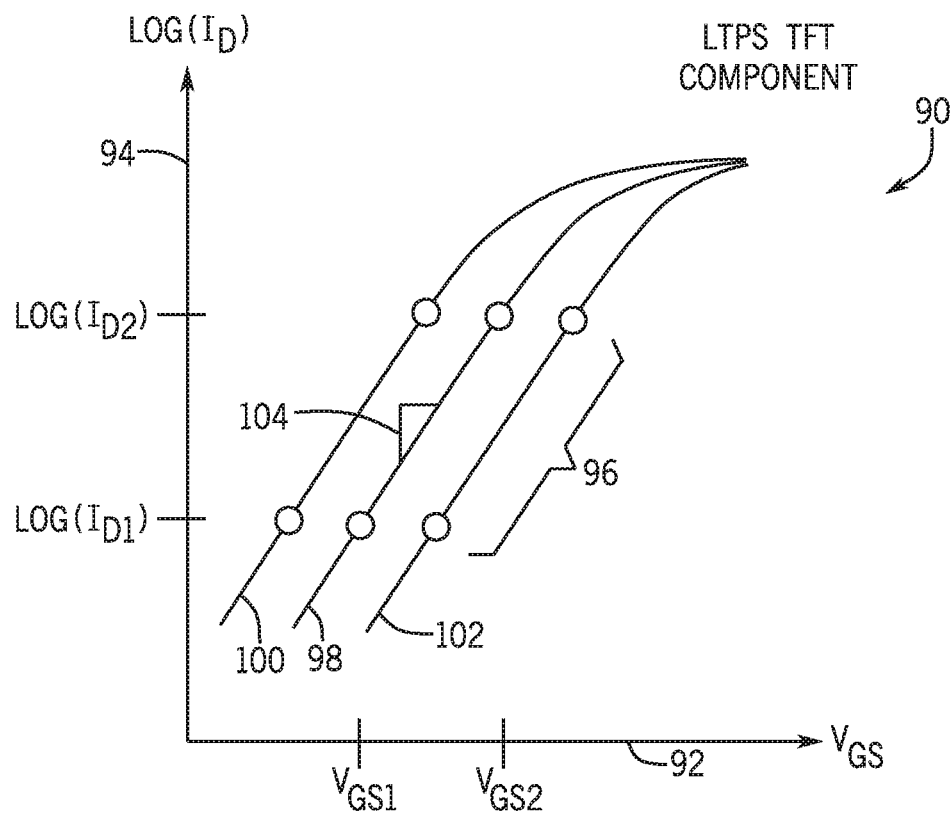
FIG. 8 is an embodiment of a chart depicting a relationship between an applied gate voltage and functionally mapped output current for a low-temperature polysilicon (LTPS) thin-film transistor (TFT) component.

FIG. 8 illustrates an embodiment of a chart 90 depicting a relationship between $V_{GS}$ and $I_D$ for a component 60 that is an LTPS TFT component. It may be appreciated that for an LTPS TFT component 60, the current $I_D$ is exponentially related to the applied voltage $V_{GS}$. Through taking the logarithm of the current $I_D$ (e.g., $\log(I_D)$), at least a portion of the chart 90 exhibits a linear region 96 that may be readily utilized for analysis as described below. The chart 90 illustrates this relationship between the applied voltage $V_{GS}$ on the x-axis 92 and the logarithm of the current $I_D$ on the y-axis 94. A first curve 98 illustrates the linear region 96 for applied voltages $V_{GS1}$ and $V_{GS2}$. It may be appreciated that the applied voltages $V_{GS1}$ and $V_{GS2}$ may be applied to the component 60 at a first operating state of the component, and the corresponding outputs $\log(I_{D1})$ and $\log(I_{D2})$ are measured outputs during the first operating state.

However, the same voltages $V_{GS1}$ and $V_{GS2}$ applied to the same component 60 during previous or subsequent operating states may produce different corresponding outputs, as shown by the second curve 100 and third curve 102. For example, the second curve 100 may illustrate the relationship between the applied voltage $V_{GS}$ and the logarithm of the current $I_D$ at a second operating state of the LTPS TFT component 60 prior to the first operating state, and the third curve 102 may illustrate the relationship between the applied voltage $V_{GS}$ and the logarithm of the current $I_D$ at a third operating state of the LTPS TFT component 60 subsequent to the first operating state. The second and third curves 100, 102 illustrate the effect of hysteresis on the measurements of the current $I_D$, despite that component is at the same temperature in the first, second, and third operating states. It may be appreciated that hysteresis is the dependence of the state of a system on its history. The hysteresis effect on the current $I_D$ measurements may cause determinations of the temperature based on the current $I_D$ measurements to also be affected by hysteresis, thereby reducing the accuracy of the determined temperature. However, it is believed that for the LTPS TFT component 60 operating at a temperature T, a slope 104 of the linear region 96 for each of the curves 98, 100, 102 is the same. That is, the slope 104 is believed to be largely independent of hysteresis. Moreover, the temperature of the LTPS TFT component 60 may be proportional to the slope 104 of the linear region 96 of the component 60. In particular the slope 104 of the linear region 96 may be related to the temperature T of the LTPS TFT component 60 as shown by the following equation:

$$\text{Slope} \propto \frac{T}{\left(1 - \left(\frac{\Delta V_H}{\Delta V_{GS}}\right)\right)} \qquad \text{Equation 1}$$

where T is the absolute temperature of the component 60, $\Delta V_H$ is a change of voltage measurements due to hysteresis, and $\Delta V_{GS}$ is the change in the applied voltage (e.g., $V_{GS2} - V_{GS1}$). When the time between the change of the applied voltage $V_{GS}$ is less than approximately 15, 10, 8, or 5 ms, the $\Delta V_H$ value approximates zero such that the slope in the linear region 96 is proportional to the absolute temperature T of the LTPS TFT component 60. Additionally, or in the alternative, when the measurements of the current $I_D$ and $V_{GS}$ for the LTPS TFT component 60 occur during the time span of one display frame of the display panel 40, then the $\Delta V_H$ value approximates zero or is substantially smaller than $\Delta V_{GS}$ such that the slope is proportional to the temperature T of the component 60. For example, if 1% temperature accuracy is desired, then a $\Delta V_H$ value less than 1% of $\Delta V_{GS}$ is sufficient. Accordingly, the temperature T of an LTPS TFT component 60 may be determined from the slope 104 of a curve plotting the applied voltage $V_{GS}$ and a logarithm of the measured output current $I_D$ because the slope 104 is proportional to the temperature T. Thus, for an LTPS TFT component 60, a logarithmic mapping function applied to the measured output current $I_D$ facilitates the determination of the temperature of the LTPS TFT component 60. This temperature of the LTPS TFT component 60 may be substantially independent of hysteresis of the measured output current $I_D$. As discussed herein, the phrase "substantially independent of hysteresis" is defined such that any error of the temperature of the LTPS TFT component 60 due to hysteresis after the application of the compensation voltage derived from the temperature measurements does not result in a visual artifact that is perceptible to an unaided human eye.

Figure 9:
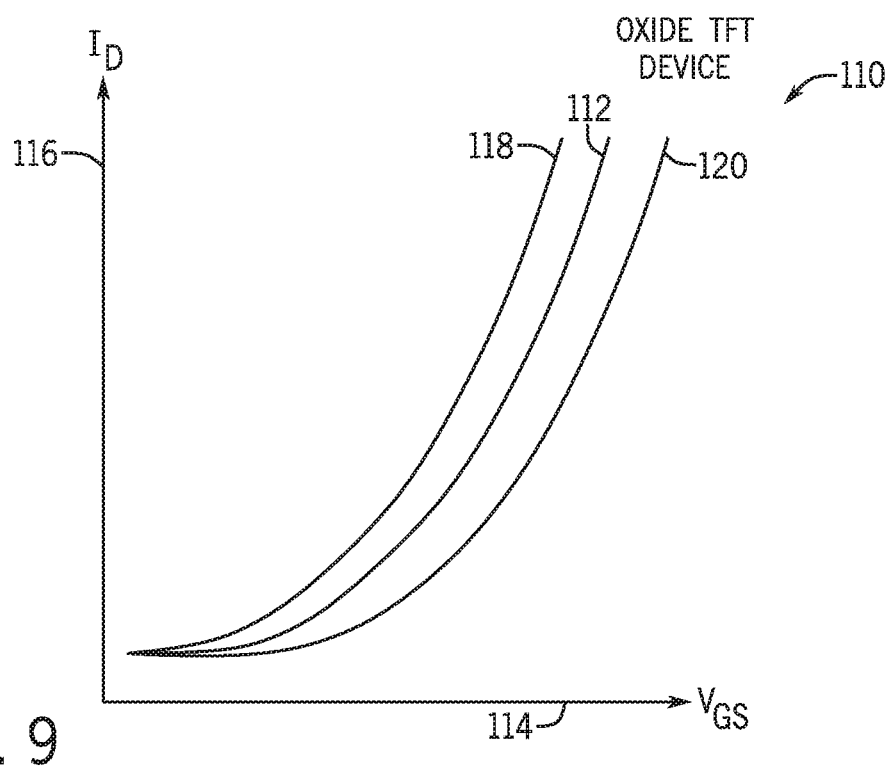
FIG. 9 is an embodiment of a chart depicting a relationship between an applied gate voltage and output current for an oxide TFT component.

FIG. 9 illustrates an embodiment of a chart 110 depicting relationship between $V_{GS}$ and $I_D$ for a component 60 that is an oxide TFT component 60. It may be appreciated that for an oxide TFT component 60, the current $I_D$ is related to the applied voltage $V_{GS}$ by a power-law function. For example, the relationship between the current $I_D$ and the applied voltage $V_{GS}$ of an oxide TFT component 60 may be shown by the following equation:

$$I_D = V_{GS}^{\gamma_0}$$  Equation 2 where $\gamma_0$ may be determined by the following equation:

$$\gamma_0 = 2\left(\frac{T_0}{T}\right)$$  Equation 3 with $T_0$ being a reference temperature and T being an absolute temperature of the oxide TFT component 60. Accordingly, the value $\gamma_0$ is inversely proportional to the temperature of the oxide TFT component 60. Therefore, determination of the value $\gamma_0$ enables the determination of the temperature of the oxide TFT component 60. A first curve 112 illustrates the power-law relationship between the applied voltage VGS 114 and the current ID 116 in a first operating state.

In a similar manner as discussed above with the LTPS TFT component 60 of FIG. 8, the operation of the same oxide TFT component 60 during previous or subsequent operating states may produce different corresponding outputs, as shown by a second curve 118 and a third curve 120. For example, the second curve 118 may illustrate the relationship between the applied voltage $V_{GS}$ and the current $I_D$ at a second operating state of the oxide TFT component 60 prior to the first operating state, and the third curve 120 may illustrate the relationship between the applied voltage $V_{GS}$ and the current $I_D$ at a third operating state of the oxide TFT component 60 subsequent to the first operating state. The second and third curves 118, 120 illustrate the effect of hysteresis on the measurements of the current $I_D$, despite that the oxide TFT component 60 is at the same temperature in the first, second, and third operating states. The hysteresis effect on the current $I_D$ measurements may cause determinations of the temperature based on the current $I_D$ measurements to also be affected by hysteresis, thereby reducing the accuracy of the determined temperature. Because the shape of the curve 112, 118, and 120 appears to be approximately the same at a temperature T for various operating states that exhibit hysteresis, it is believed that determination of the value $\gamma_0$ for the curve 112 as described below may reduce or eliminate hysteresis from temperature measurements of the oxide TFT component 60.

Figure 10:
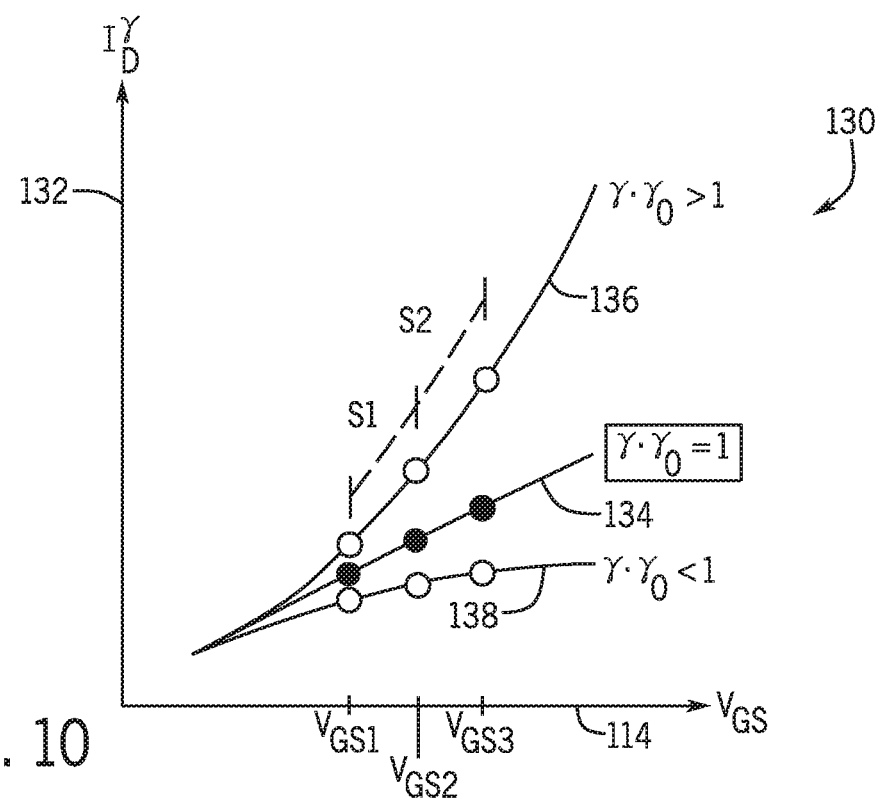
FIG. 10 is an embodiment of a chart depicting a relationship between an applied gate voltage and functionally mapped output current for an oxide TFT component.

To determine the value $\gamma_0$, a power rule mapping function may be applied to three or more current measurements $I_D$. It may be appreciated that an inverse $\gamma$ of the value $\gamma_0$ may be estimated computationally with three or more corresponding measurements of $V_{GS}$ and $I_D$, as described with FIG. 10. Chart 130 illustrates an embodiment of iterations of a power rule mapping function applied to a set of current $I_D$ measurements corresponding to the applied voltage $V_{GS}$ 114. The y-axis 132 of the chart 130 depicts the current $I_D$ adapted by the power rule mapping function, which raises the current $I_D$ measurements to the $\gamma$ power. Where three or more mapped current values $I_D$ for corresponding applied voltages (e.g., $V_{GS1}$, $V_{GS2}$, $V_{GS3}$) have a linear correlation, as shown by the middle curve 134, the value $\gamma$ of the power rule mapping function is the inverse of the value $\gamma_0$. That is, the absolute temperature T of the oxide TFT component 60 may be determined from that value $\gamma$ from the power rule mapping function. Accordingly, the linearization of the current values $I_D$ with respect to the applied voltage $V_{GS}$ may enable the temperature T of the oxide TFT component 60 to be determined with a reduced effect of hysteresis.

However, where three or more mapped current values $I_D$ do not have a linear correlation, the value $\gamma$ of the power rule mapping function may be determined to be greater than or less than the inverse of the value $\gamma_0$. For example, where the curve through the mapped current values $I_D$ is concave up, as shown by the top curve 136, then the value $\gamma$ of the power rule mapping function may be determined to be greater than the inverse of the value $\gamma_0$. Where the curve through the mapped current values $I_D$ is concave down, as shown by the bottom curve 138, then the value $\gamma$ of the power rule mapping function may be determined to be less than the inverse of the value $\gamma_0$. It may be appreciated that upon determination that the value $\gamma$ of the power rule mapping function is not determined to be within a threshold (1% or less) of the inverse of the value $\gamma_0$, the value $\gamma$ of the mapping function may be iteratively adjusted (e.g., tuned) to determine a better estimation of the value $\gamma$.

As discussed above each component (e.g., transistor, diode) may have a respective relationship between the applied voltage, output current, and temperature that may be determined through application of a mapping function to the output current. In some embodiments, the applied voltage and measured output current values used to determine the temperature of the respective components may be determined while the controller simultaneously controls the electronic display with control signals and/or data signals for a display frame of the electronic display. That is, a test signal (e.g., applied voltage value) for a component may be inserted prior to a control signal for a display frame, or inserted after a control signal for a display frame. Additionally, or in the alternative, the test signal (e.g., applied voltage value) for a component may be applied in a separate test frame, which may be brief and imperceptible to a human operator of the electronic device. In some embodiments, the test signal is applied periodically during operation of the electronic display, upon reset or startup of the electronic display, or during every frame of the electronic display. As discussed herein, application of a test signal to a component may include the application of 2, 3, 4, 6, 10, or more gate voltages ($V_{GS}$) and the determination of the corresponding output currents ($I_D$) during a brief time span (e.g., less than 20, 15, 10, 8, or 5 ms). As discussed above, the change of voltage measurements due to hysteresis ($\Delta V_H$) may be reduced or eliminated when the gate voltages ($V_{GS}$) are applied near one another in time, such as within less than approximately 15, 10, 8, or 5 ms of a prior gate voltage of the test signal.

Figure 11:
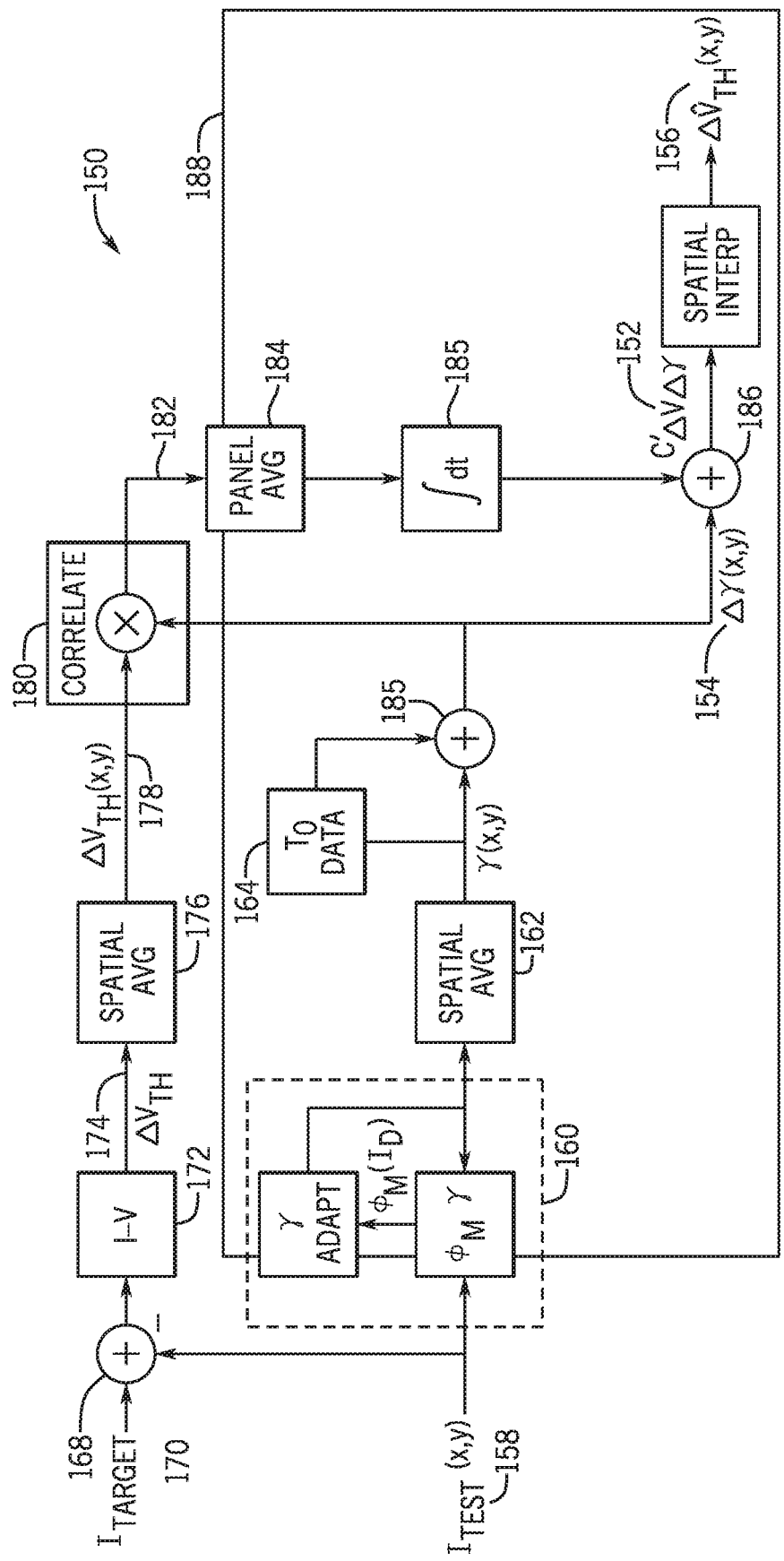
FIG. 11 is an embodiment of a process for determining a temperature map for components of a display and compensating control signals to the components based at least in part on the temperature of the components.

FIG. 11 illustrates an embodiment of a process 150 for determining a threshold shift compensation coefficient 152 and a temperature map 154 that is substantially free of hysteresis. That is, the temperature map 154 may be substantially independent of hysteresis such that any error of the temperature map 154 due to hysteresis after the application of the compensation voltage derived from the temperature measurements does not result in a visual artifact that is perceptible to an unaided human eye. With the threshold shift compensation coefficient 152 and the temperature map 154 across the display panel 40, the controller 48 may appropriately compensate the control signals 156 to the component to reduce or eliminate temperature effects on the display of a target image on the display panel 40 of the electronic display 12. The controller 48 of the display panel 40 or another processor of the electronic device 10 may execute instructions for the process 150.

Results 158 (e.g., applied gate voltages $V_{GS}$ and corresponding output currents $I_D$) from an applied test signal for one or more components are provided to a mapping function block 160. The results 158 may include $V_{GS}$ and $I_D$ data sets (e.g., curves) from all or a subset of components across the display panel 40. The mapping function block 160 determines an intermediate value (e.g., γ) related to the temperature of each respective component 60. In some embodiments and for some types of components 60, application of the mapping function may enable the direct determination of the intermediate value for the component. In other embodiments, the mapping function may be applied to the results to iteratively determine (e.g., tune) the intermediate value. The mapping function block 160 enables the determination of the intermediate value, which is substantially independent of hysteresis of the results 158 (e.g., output currents $I_D$). That is, the intermediate value may be substantially independent of hysteresis such that any error of the intermediate value due to hysteresis after the application of the mapping function block 160 does not result in a visual artifact that is perceptible to an unaided human eye. For example, as described above with FIG. 8, a logarithmic mapping function applied to the output current for an LTPS TFT component may facilitate determination of an intermediate value (e.g., slope) that is proportional to temperature of the LTPS TFT component. Additionally, as described above with FIGS. 9 and 10, a power rule mapping function applied to the output current for an oxide TFT component may facilitate determination of an intermediate value (e.g., $γ_0$) that is inversely proportional to the temperature of the oxide TFT component. In some embodiments, the intermediate value (e.g., slope, $γ_0$) is determined through an iterative process, as described above with the oxide TFT component. In some embodiments, a generic nonlinear mapping function ($Φ_M$) applied to the output current for a component may be defined by the following equation:

$$Φ_M(I_D) = a\ln\left(1 + \frac{V_{GS}}{a}\right) \qquad \text{Equation 4}$$

where a is a tuned intermediate value related to the temperature of the component.

The controller utilizes the mapping function block 160 to produce an intermediate value for each component represented by the results 158. In some embodiments, intermediate values related to temperature measurements correspond to each respective component across a display panel 40. In some embodiments, the intermediate values correspond to only a subset of the respective components across the display panel 40, such as a subset of 50, 30, 25, 20, 10, 5, or 1 percent of the components of the display panel 40. Where only the intermediate values correspond to a subset of the respective components across the display panel 40, each intermediate value may be representative of the temperature of a region of the display panel 40 that surrounds the respective component. Additionally, or in the alternative, the intermediate values in a region of the display panel may be consolidated (block 162) to a spatially averaged intermediate value for the region. For example, an electronic display with full HD resolution may enable the determination of intermediate values for each component in a 1920× 1080 array across the display panel 40; however, the display panel 40 may be subdivided into regions, such as a 16×9 array, where each region includes multiple components. In some embodiments, the regions of the display panel 40 are distributed non-uniformly across the display panel 40. The controller 48 compares (node 166) the intermediate values for each component 60 or for each region with temperature reference data 164 (e.g., $T_0$) to determine a temperature map 154 across the display panel 40.

The controller 48 compares (node 168) the results 158 from the applied test signal for one or more components to a target output current 170 for a display frame to be displayed on the display panel 40, and converts (block 172) the comparison result to a voltage threshold shift 174 ($ΔV_{TH}$) for each component. However, this determined voltage threshold shift 174 is not free of hysteresis, and is an estimate of a threshold shift of the component 60 relative to a reference state of the component 60, such as during fabrication of the display panel 40. This threshold shift 174 for each component may be aggregated and spatially averaged (block 176) for regions of the display panel 40, in a similar manner as discussed above with block 162 for the intermediate value. Accordingly, an array 178 of threshold shifts is determined for components or regions across the display panel 40.

As discussed above, the voltage threshold shift ($V_{TH}$) for a component 60 may be related to the temperature of the component, the structure of the component, the materials of the component, or any combination thereof. The controller 48 correlates (block 180) the temperature map 154 with the array of threshold shifts to determine a correlation 182 for each region or component 60. This correlation 182 for each region or component 60 across the display panel 40 may be averaged at block 184 and integrated (block 185) over two or more image frames to determine the threshold shift compensation coefficient 152. In some embodiments, the output of the block 184 may be integrated (block 185) over 2, 3, 4, 5, 6, 7, 8, 9, 10, or more image frames. This integration of the panel averaged correlation enables an array of compensated control signals 156 to converge to the threshold shift compensation coefficient 152, thereby reducing or eliminating any average correlation present for the components 60 of the display panel 40. That is, the modification of the compensated control signals 156 over two or more image frames may cause the temperature-correlated components of the threshold shift array 178 to approach zero on average across the display panel 40, thereby effectively removing the temperature-correlated component of the threshold shift array 178. Moreover, because the threshold shift compensation coefficient 152 is averaged over the display panel 40 rather than determined from just one component or a smaller region of the display panel 40, hysteresis of the threshold shift correlation 182 is suppressed. The controller 48 may cross-multiply (node 186) the threshold shift compensation coefficient 152 with the temperature map 154 (array) to determine an array of compensated control signals 156 that reduce or eliminate temperature effects on the display of a target image on the display panel 40. It may be appreciated that the processes and values illustrated in block 188 of FIG. 11 are substantially independent of effects of hysteresis on the results 158 from the applied test signal.

Figure 12:
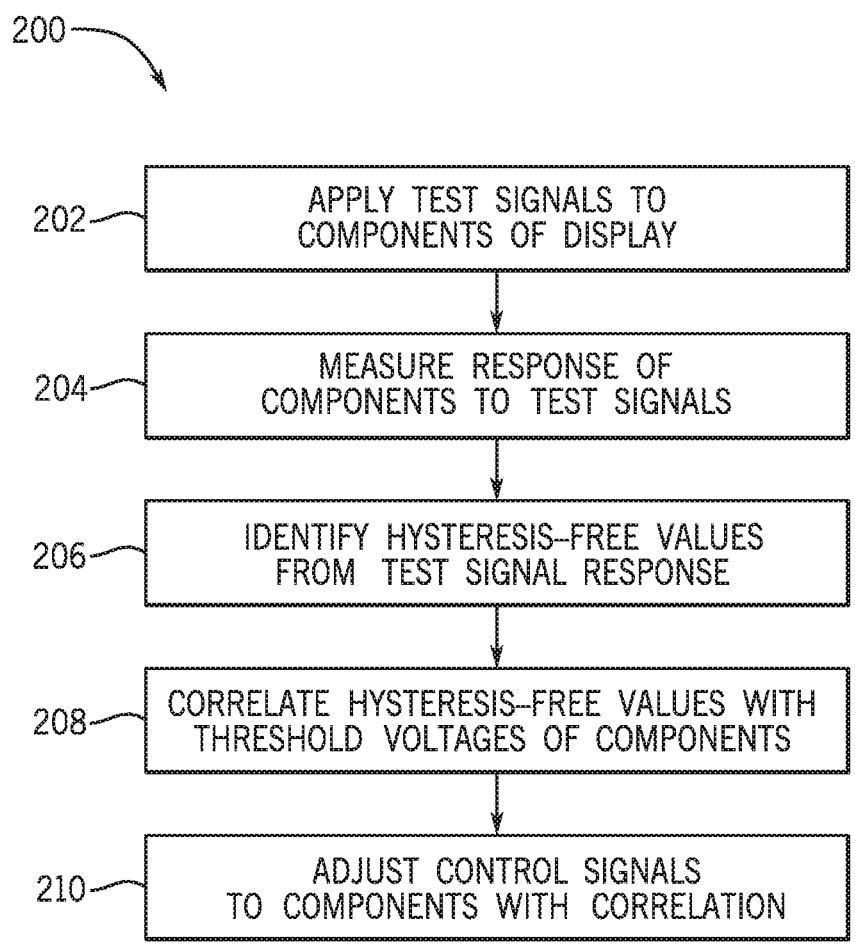
FIG. 12 is an embodiment of a flowchart for adjusting image data to compensate for temperature.

FIG. 12 is an embodiment of a flowchart 200 that may be executed by the controller 48 to adjust control signals (i.e., image data) to compensate for the temperature of components of the display panel 40. The controller 48 applies (block 202) test signals to components 60 of the display panel 40. For example, the controller 48 may apply gate voltages $V_{GS}$ to each component 60 of the display panel 40, or to a subset of components 60 across the display panel 40. The controller 48 measures (block 204) the response of each tested component. For example, the controller 48 may measure an output current $I_D$ from each component in response to the applied gate voltage $V_{GS}$. The controller 48 identifies (block 206) hysteresis free values from the measured response and applied test signals. As discussed in detail above, these hysteresis-free values may be identified through the application of a mapping function to the measured response, through a graphical processing (e.g., slope identification, curve fitting) of a plot of the measured response and the test signals, or any combination thereof. In some embodiments, the controller 48 correlates (block 208) the identified hysteresis-free values with other characteristics of the components 60. These other characteristics of the components 60, such as threshold voltages, may be affected by hysteresis. However, through this correlation of block 208, the controller 48 may identify a compensation coefficient that is largely free of hysteresis. Accordingly, the controller 48 may adjust (block 210) control signals to the components 60 based at least in part on the correlation to compensate the control signals for the components 60 of the display panel 40.

Accordingly, embodiments of the system and methods described above may utilize the output from components (e.g., transistors, diodes) to determine substantially hysteresis-free temperature measurements across a display panel. These hysteresis-free temperature measurements may be utilized to compensate subsequent control signals to the components for temperature-related affects on the component, such as a shift in the threshold voltage. Through compensation of the control signals to the components for temperature, the accuracy and/or consistency of images displayed on the display panel via the components may be improved.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A method for operating an electronic display, comprising:
   measuring a plurality of current outputs of a component of the electronic display in response to a plurality of applied gate voltages;
   applying a mapping function to the plurality of current outputs to generate a plurality of adapted current outputs;
   determining an intermediate value related to a temperature of the component, wherein the intermediate value corresponds to a relationship between the plurality of applied gate voltages and the plurality of adapted current outputs, and the intermediate value is substantially independent of hysteresis of the measured plurality of current outputs; and
   adjusting a control signal to the component based at least in part on the intermediate value.

2. The method of claim 1, wherein the component comprises a low-temperature polysilicon (LTPS) thin-film transistor (TFT) component.

3. The method of claim 2, wherein the mapping function comprises a logarithmic mapping function.

4. The method of claim 1, wherein the component comprises an oxide TFT component.

5. The method of claim 4, wherein the mapping function comprises a power rule mapping function.

6. The method of claim 5, wherein the determining the intermediate value comprises iteratively applying the mapping function to the plurality of current outputs to tune an output to the intermediate value.

7. The method of claim 1, comprising:
   correlating the intermediate value with a voltage threshold shift of the component to determine a correlation; and
   adjusting the control signal to the component based at least in part on the intermediate value and the correlation.

8. The method of claim 1, comprising:
   determining a temperature of the component based at least in part on a comparison of the intermediate value with reference temperature data; and
   adjusting the control signal to the component based at least in part on the temperature of the component.

9. An electronic device comprising:
   one or more processors configured to generate image data; and
   an electronic display configured to display the image data, wherein the electronic display comprises a plurality of display pixels, each display pixel comprises a respective component, and the plurality of display pixels is configured generate an image on the electronic display based on the image data; and
   a controller configured to compensate the image data based on a plurality of temperatures of the electronic display, wherein the controller is configured to:
      apply test signals to each component of the plurality of components of the electronic display;
      identify an intermediate value related to a temperature of each component, wherein the intermediate value is substantially independent of hysteresis of the respective component; and adjust control signals to each component of the plurality of components of the electronic display based at least in part on the intermediate value for the respective component.

10. The electronic device of claim 9, wherein the controller is configured to:
measure a response of each component of the plurality of components to the test signals applied to each component;
apply a mapping function to the response of each component of the plurality of components to determine an adapted response;
identify the intermediate value related to the temperature of each component based at least in part on a relationship between the test signals applied to the respective component and the adapted response of the respective component.

11. The electronic device of claim 10, wherein each component comprises a low-temperature polysilicon (LTPS) thin-film transistor (TFT) component, and the mapping function comprises a logarithmic mapping function.

12. The electronic device of claim 10, wherein each component comprises an oxide TFT component, and the mapping function comprises a power rule mapping function.

13. The electronic device of claim 9, wherein the controller is configured to correlate the intermediate value for each component with a characteristic of the respective component to determine a correlation for the respective component, and to adjust the control signals based at least in part on the intermediate value for the respective component and the correlation.

14. The electronic device of claim 13, wherein the characteristic of the respective component comprises a threshold voltage of the respective component.

15. The electronic device of claim 9, wherein the controller is configured to determine a temperature map of the electronic display based at least in part on the determined intermediate values for the respective components.

16. A non-transitory, computer-readable medium comprising executable instructions for a processor of an electronic device, the executable instructions comprising instructions to:

measure current outputs of a plurality of components of the electronic device in response to applied gate voltages;
apply a mapping function to the current outputs of each component of the plurality of components to generate adapted current outputs for each component of the plurality of components;
determine an intermediate value related to a temperature of each component, wherein the intermediate value corresponds to a relationship between the applied gate voltages and the adapted current outputs for the respective component, and the intermediate value is substantially independent of hysteresis of the measured current outputs to the respective component; and
adjust a control signal to each component based at least in part on the intermediate value for the respective component.

17. The non-transitory, computer-readable medium of claim 16, wherein each component comprises a low-temperature polysilicon (LTPS) thin-film transistor (TFT) component, and the mapping function comprises a logarithmic mapping function.

18. The non-transitory, computer-readable medium of claim 16, wherein each component comprises an oxide TFT component, and the mapping function comprises a power rule mapping function.

19. The non-transitory, computer-readable medium of claim 16, comprising instructions to spatially average the intermediate values in a region of the electronic device, wherein the control signal to each component is based at least in part on the spatially averaged intermediate value for the region.

20. The non-transitory, computer-readable medium of claim 16, comprising instructions to correlate the intermediate value for each component with a voltage threshold shift of the respective component to determine a correlation for the respective component, and to adjust the control signal to the respective component based at least in part on the intermediate value and the correlation.

* * * * *